(12) United States Patent
Mochizuki et al.

(10) Patent No.: US 7,898,755 B2
(45) Date of Patent: Mar. 1, 2011

(54) METHOD FOR MEASURING WRITE WIDTH AND/OR READ WIDTH OF A COMPOSITE MAGNETIC HEAD AND A MEASURING DEVICE USING THE METHOD

(75) Inventors: Hideki Mochizuki, Ashigarakami-gun (JP); Yoshihiro Sakurai, Ashigarakami-gun (JP); Toshiaki Suzuki, Ashigarakami-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 200 days.

(21) Appl. No.: 12/370,245

(22) Filed: Feb. 12, 2009

(65) Prior Publication Data

US 2009/0262446 A1  Oct. 22, 2009

(30) Foreign Application Priority Data

Apr. 16, 2008  (JP) .................. 2008-106452

(51) Int. Cl.
G11B 27/36  (2006.01)
(52) U.S. Cl. ........................................... 360/31
(58) Field of Classification Search ............ 360/31, 360/53, 55, 75, 73.01, 73.08, 73.09; 324/210, 324/212; 369/13.25
See application file for complete search history.

(56) References Cited

U.S. PATENT DOCUMENTS

| | | | | |
|---|---|---|---|---|
| 4,904,938 A | * | 2/1990 | O'Reilly et al. | 324/212 |
| 5,023,548 A | * | 6/1991 | McMorran | 324/212 |
| 5,896,156 A | * | 4/1999 | Suzuki et al. | 347/171 |
| 6,696,831 B2 | * | 2/2004 | Nozu | 324/210 |
| 6,765,738 B1 | * | 7/2004 | Kamatani et al. | 360/55 |
| 2005/0002282 A1 | * | 1/2005 | Shiratori | 369/13.25 |

FOREIGN PATENT DOCUMENTS

| | | |
|---|---|---|
| JP | 2000-231707 | 8/2000 |
| JP | 2007-012119 | 1/2007 |
| JP | 2007-149155 | 6/2007 |

* cited by examiner

*Primary Examiner* — Fred Tzeng
(74) *Attorney, Agent, or Firm* — Mattingly & Malur, P.C.

(57) ABSTRACT

A write sensitive width is calculated by writing a test data by a write head by moving the write head in a radial direction of a magnetic recording medium at a designated speed K to obliquely cross a designated track or a track adjacent to the designated track, reading the test data recorded in the track obliquely by a read head to obtain a read characteristics profile of a read voltage with respect to the track scanning time and obtaining a moving distance in the radial direction of the head by multiplying the test data scanning time of the read head with the designated moving speed K.

14 Claims, 5 Drawing Sheets

METHOD FOR MEASURING WRITE WIDTH AND/OR READ WIDTH OF A COMPOSITE MAGNETIC HEAD AND A MEASURING DEVICE USING THE METHOD

TECHNICAL FIELD

This invention relates to a measuring method for measuring write width and/or read width of a composite magnetic head and a measuring device for performing the measuring method. Particularly, in a characteristics test of a composite magnetic head including an MR (magneto-resistance) read head and a thin film inductive write head, the invention relates to a measuring method for easily measuring a write sensitive width of the write head and/or a read sensitive width of the MR head (read head) of the composite magnetic head by reading and writing data with respect to a magnetic recording medium (discrete track media (DTM)) of a discrete track system, a track width of which is narrower than the write sensitive width of the thin inductive head (write head) and a measuring device for performing the method.

BACKGROUND ART

The hard disk drive (HDD) for a disk of 3.5 to 1.8 inches or even 1.0 inch or less has been used in various fields of automobile products, home electrical appliances and audio appliances, etc. Therefore, the reduction of cost of hard disk drive and the mass production thereof have been requested and the large memory capacity thereof has been also requested.

In order to satisfy these requests, there is a tendency that the high density recording magnetic disk media of the vertical magnetic memory system, which has lately been put to practical use, has been employed in the above mentioned fields and spread rapidly.

The magnetic disk medium of the vertical magnetic memory system is used in a composite magnetic head having a TMR (tunnel magneto-resistance) head or a GMR (giant magneto-resistance) head, which is a memory medium separable from the head by 10 nanometer or less controllably.

Such magnetic disk medium generally includes a glass substrate, a soft magnetic layer formed on the glass substrate and a magnetic layer provided on the soft magnetic layer. Discrete tracks are formed in a discrete substrate by etching the magnetic layer. (Incidentally, the term "disk substrate" is used as a material of a magnetic disk to be mounted on a hard disk drive.)

The etching for forming grooves between tracks is performed through an uneven photo-resist film. The unevenness of the photo-resist film is formed by forming the photo-resist film on the magnetic layer of the disk substrate by using the nano-print lithography and pushing the photo-resist film with an uneven stamper. The track width of the discrete track formed by the dry etching through the uneven photo-resist film is 100 nm or less and the groove separating adjacent tracks is filled with a non-magnetic material in a later step.

Such technique is described in JP-2007-012119A and JP-2007-149155A, etc., and is well known.

The magnetic disk of this kind is called as a magnetic recording medium of the discrete track system (DTM) and is currently paid attention to a technique capable of realizing ultra high density recording exceeding 1 terabit/(inch)$^2$ for 2.5 inches several years later. Further, the bit patterned medium (BPM) having discrete tracks, which are finely separated magnetically in the track direction, has been entered into the practical implementation step recently.

Since a magnetic film of the prior art magnetic disk used in HDD is formed on the whole surface of the medium, the prior magnetic disk is easily possible to record test data (test burst signal) in arbitrary track by a write head. Therefore, the read voltage characteristics, that is, the read characteristics profile (waveform), with respect to the moving distance of the read head crossing the track can be obtained easily by reading test data recorded in the track while moving the read head continuously in radial direction of the disk. With the profile of the read characteristics, the write sensitive width of the write head and the read sensitive width of the read head can easily be measured as the characteristic parameter of the composite magnetic head in the magnetic head test and, therefore, the composite magnetic head can be evaluated or tested.

Figure 6:
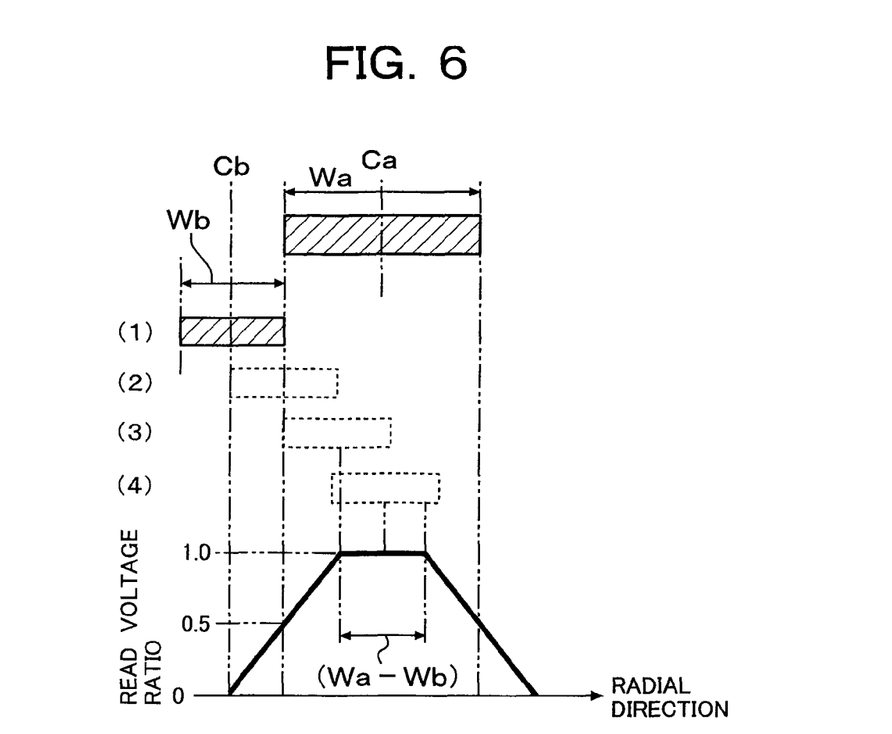
FIG. 6 explains a conventional measuring method in which a write sensitive width of a write head and a read sensitive width of an MR head are measured as a characteristic parameter of a magnetic head.

FIG. 6 explains a prior art measuring method for measuring a write sensitive width of a write head and a read sensitive width of a read head as characteristic parameters of a magnetic head.

In FIG. 6, it is assumed that a write of test data in a designated track with write sensitive width Wa by a composite magnetic head (write head) has been completed already. In a read step of the test data, the test data is read by moving the composite magnetic head (read head) rightward in the drawing along a radial direction of the disk across the designated track.

In a position (1) shown in FIG. 6, a right side end of a read sensitive width Wb of an MR head (read head) corresponds to a left side end of the write sensitive width Wa of the test data. At this time, a gap (center line Cb) of the MR head can read the test data (the left side end thereof) written by the write head. In this case, the read voltage is still 0 (zero).

In order to simplify the description, the unit of the read voltage of the MR head is not [mV] but a ratio in a range between numerical value "0" and numerical value "1" under a maximum read voltage of the test data being 1. Incidentally, each of the sensitive widths Wa and Wb of the heads is determined by the gap width of the heads. The write sensitive width Wa of the write head (thin film inductive head) was usually in the order of several μm. In the DTM, the write sensitive width of the write head is in the order of 50 nm to 80 nm and the track width is 50 nm or less. Further, the track formed is eccentric. Therefore, even if the write sensitive width of the write head is close to the track width substantially, there is a problem that the track width becomes narrower than the write sensitive width of the write head in the data recording state.

At a position (2), the read sensitive width Wb of the MR head enters into the side of the write sensitive width Wa by Wb/2. Therefore, Wb/2 of the right side of the read sensitive width Wb becomes on the write sensitive width Wa. In this state, the read voltage becomes 0.5 when the test data is written uniformly. When the MR head is moved rightward further to a position (3), the read sensitive width Wb overlaps the write sensitive width Wa completely. Therefore, the maximum read voltage becomes 1.0. When Wa>Wb, the voltage in the width range (Wa−Wb) becomes 1.0 evenly and the read voltage becomes flat. Therefore, when the MR head is at a position (4), the read voltage is 1.0. As a result, it is possible to obtain the profile (waveform) of the read voltage characteristics having a center flat portion as shown by a thick solid line. Incidentally, the head parameter measuring method of this kind is described in JP-2000-231707A and known publicly.

When the track width becomes narrower than the write sensitive width Wa of the write head as in the DTM, the read head can not cross the whole write region determined by the write sensitive width even if the read head is moved in radial direction. Therefore, there is the problem that the profile of the read voltage characteristics shown in FIG. 6 can not be obtained. Further, since the read sensitivity width of the read head in the DTM becomes close the track width, it is impossible to obtain the profile having the center flat portion as shown in FIG. 6. Therefore, it becomes difficult to measure the write sensitive width of the write head and the read sensitive width of the read head.

SUMMARY OF THE INVENTION

An object of this invention is to provide a measuring method for easily measuring a write sensitive width of a write head and/or a read sensitive width of a read head by reading and writing data with respect to a DTM, etc., having a track width narrower than a write sensitive width of a write head.

Another object of this invention is to provide a measuring device for easily measuring a write sensitive width of a write head and/or a read sensitive width of a read head by reading and writing data with respect to a DTM, etc., having a track width narrower than the write sensitive width of the write head of a composite magnetic head.

A construction of a measuring method or a measuring device for measuring a write width and/or a read width of a composite magnetic head according to a first invention, comprises the steps of moving the composite magnetic head to obliquely cross a designated track of a rotating DTM, BTM or other magnetic recording medium having a recording layer of uneven pattern at a designated speed K under an ON track servo control by reading a servo information from the designated track and writing a test data in a designated track by a write head, reading the test data from the designated track by a read head by positioning the composite magnetic head in the designated track under the ON track servo control, obtaining a read characteristics profile for a read voltage with respect to a track scanning time of the read head on the basis of the read signal of the read head, and calculating a write sensitive width by multiplying the test data scanning time of the read head by a designated moving speed K.

According to a second invention, a write sensitive width is calculated by obtaining a read characteristics profile by positioning the composite magnetic head in the designated track of a rotating DTM, BTM or other magnetic recording medium having a recording layer of uneven pattern under an ON track servo control, moving the composite magnetic head to obliquely cross a track adjacent to the designated track at a designated speed K, writing the test data in the adjacent track and reading the test data from the adjacent track.

In this invention, the read characteristics profile concerning a read voltage for the track scanning time of the head is obtained by moving the write head to obliquely cross the designated track or a track adjacent to the designated track in the radial direction of the DTM or BPM, etc., at the designated speed K to write the test data and reading the test data recorded in the track obliquely by the read head. The write sensitive width is calculated by the relative moving distance in the radial direction of the head with respect to the test data by multiplying the designated moving speed K by the test data scanning time of the read head.

Since the test data is written obliquely in the track by moving the write head in the radial direction, an angle of inclination depends on the moving speed of the write head in the radial direction.

A front boundary line and a rear boundary line of the test data recorded in a track upon the moving speed of the write head in the radial direction of the recording area become oblique. The front boundary line is a recording locus of a front portion of the recording area corresponding to the write sensitive width by the write head and the rear boundary line is the recording locus of a rear portion of the recording area corresponding to the write sensitive width by the write head.

When the read head scans the test data written obliquely in the track from the front boundary line to the rear boundary line, all of the write sensitive width of the test data moving the radial direction is scanned.

Assuming that the side of the test data recorded by the movement in the radial direction is a fixed side, the test data is read by moving the read head in the radial direction with respect to the test data. The relative distance in the radial direction to the test data of the read head corresponds to the scanning time with respect to the test data.

If the rotation speed of the magnetic recording medium in one revolution is the same at the write time and the read time, the speed of the write head in the rotating direction of the magnetic recording medium when the test signal is written and the speed of the read head in the rotating direction of the magnetic recording medium when the test signal is read are the same. Therefore, the scanning times of the read head and the write head in the rotating direction of the magnetic recording medium and the scanning positions are the same. However, since the recorded test data moves in the radial direction together with the scanning of the write head, the reading of the test data by moving the read head depends on the movement of the test data in the radial direction and the scanning time of the read head.

In the latter case, when the scanning position of the read head with respect to the test data is the fixed side which is the test data side, the read head is moved in the radial direction relatively. Therefore, when the read head crosses the test data, the relation between the test data and the read head becomes the same as the conventional relation between the test data and the read head when the read characteristics profile is obtained.

Incidentally, it is possible to calculate the relative moving distance of the read head in the radial direction by multiplying the scanning time of the read head with the moving speed K in the radial direction.

Thus, it is possible to obtain the read characteristics profile for the read voltage with respect to the moving direction of the composite magnetic head in the radial direction similarly to the conventional manner.

As a result, it is possible to measure the write sensitive width of the write head and the read sensitive width of the read head for the DTM or the BTM in which the track width is narrower than the write sensitive width of the write head similarly to the conventional magnetic disk.

BRIEF DESCRIPTION OF THE DRAWINGS

FIG. 3(*a*) shows an obliquely written test data in an ON track servo control and FIG. 3(*b*) shows a measured read characteristics profile and a read characteristics approximate profile corresponding to the conventional magnetic head.

DESCRIPTION OF THE PREFERRED EMBODIMENT

Figure 1:
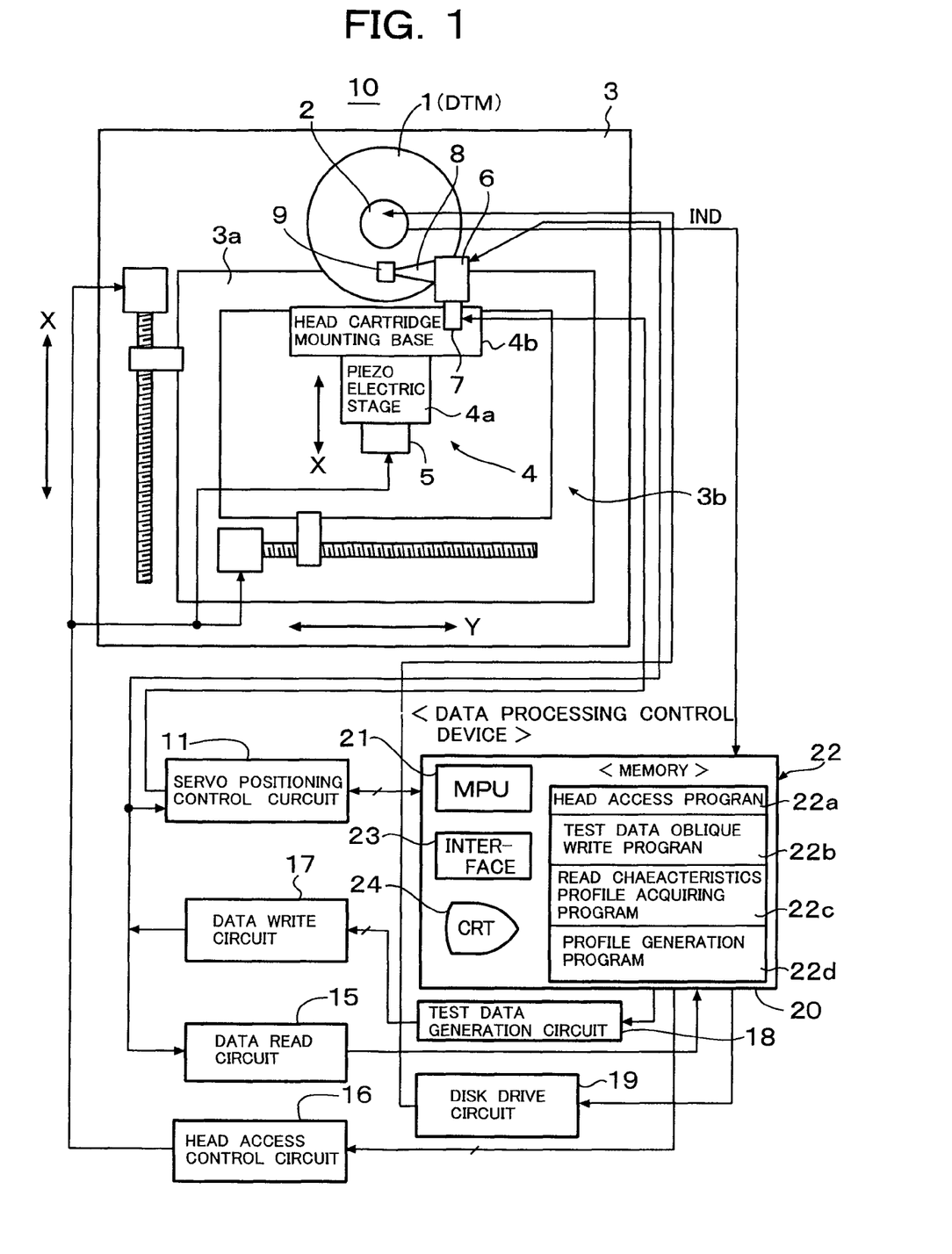
FIG. 1 is a block diagram of a write and/or read width measuring device of a MR composite magnetic head according to an embodiment to which the method for measuring a write width and/or a read width of the composite magnetic head is applied.

In FIG. 1, a reference numeral 10 depicts a magnetic head tester and a reference numeral 1 depicts a DTM (discrete track medium) which is mounted on a spindle 2 detachably. An XY stage 3 as a head carriage is provided adjacent to the spindle 2. The XY stage 3 is composed of an X stage 3a and a Y stage 3b.

Incidentally, the DTM 1 is a disk whose discrete tracks are eccentric with respect to a rotation center of the spindle 2 when it is mounted on the spindle 2. In a usual DTM, a center of the DTM is eccentric with respect to a rotation center of a spindle 2 and a center of discrete tracks formed in the DTM are eccentric with respect to the center of the DTM. Therefore, the tracks formed in the disk become eccentric with respect to the rotation center of the spindle unless the eccentricity is corrected stepwise. For this reason, it can be said that 2 tracks or more become eccentric in the DTM 1 mounted on the spindle 2.

The X stage 3a is movable in a radial direction of the DTM 1 so that a piezoelectric stage 4 on which a composite magnetic head 9 which has the MR head (read head) and the thin film inductive head (write head) and is an object to be tested is mounted is movable in the radial direction of the DTM 1 through the Y stage 3b.

The Y stage 3b is mounted on the X stage 3a for moving the head 9 for a skew regulation with respect to the head 9. The piezoelectric stage 4 for finely regulating a position of the head 9 in X direction is mounted on the Y stage 3b.

The piezoelectric stage 4 is composed of a movable base 4a, a head cartridge mounting base 4b and a piezoelectric actuator 5. The head cartridge mounting base 4b is connected to a top side of the movable base 4a. The movable base 4a is mounted on the Y stage 3b through the piezoelectric actuator 5 to move the head cartridge mounting base 4b along X axis.

Thus, when the piezoelectric actuator 5 is driven, the head cartridge mounting base 4b moves in X direction and the fine regulation of the head position in the radial direction of the DTM 1 is performed through a head cartridge 6. Incidentally, the X direction is coincident to a radial direction passing through the center of the DTM 1.

The head cartridge 6 is mounted on the head cartridge mounting base 4b through the piezoelectric actuator 7 and a suspension spring 8 is fixed onto the head cartridge 6. The piezoelectric actuator 7 may be mounted inside of the head cartridge 6. In such case, the piezoelectric actuator is mounted between the suspension spring 8 and a head mounting base of the suspension spring 8 of the head cartridge 6 in such a way that the head 9 can be moved radially through the suspension spring 8. Since, in this case, the mass to be driven by the piezoelectric actuator 7 becomes small, it is possible to improve the responsibility of the ON truck servo control.

The head 9 is mounted on a top end side of the suspension spring 8. The head 9 performs the so-called head access operation for reading data from one of the tracks of the DTM 1 or writing data in the track by moving the head 9 radially along the X axis direction of the DTM 1 to scan the tracks of the DTM 1 and positioning the head 9 in the track.

The head cartridge 6 mounts the head 9 on a head carriage detachably and includes a read amplifier and a write amplifier therein. The read amplifier receives a read signal from the MR head, amplifies the read signal and outputting the amplified signal to a data read circuit 15 and a servo positioning control circuit 11.

The servo positioning control circuit 11 is composed of an aimed position voltage generator circuit, a servo voltage demodulation•position voltage arithmetic circuit, an error voltage generator circuit, a phase compensation filtering circuit for the piezoelectric actuator 7 on the cartridge side and a piezoelectric actuator driver, etc., and reads servo information provided correspondingly to sectors to perform the servo control (ON track servo control) in such a way that the head 9 becomes ON track state with respect to the aimed track positioned correspondingly to the servo information.

Incidentally, the servo information is usually composed of a 4-phase burst signal having A phase, B phase, C phase and D phase which are sequentially separated by W/4 each other in the radial direction of a track having width of W.

A data read circuit 15 receives a read signal of the MR head from a read amplifier provided in the head cartridge 6, binarizes the read signal and sends the designated signal to a data processing•control device 20. A reference numeral 16 depicts a head access control circuit. The head access control circuit 16 receives a control signal from the data processing•control device 20 to drive the XY stage 3 and the piezoelectric actuator 5 to thereby position the head 9 in a designated track.

Figure 5:
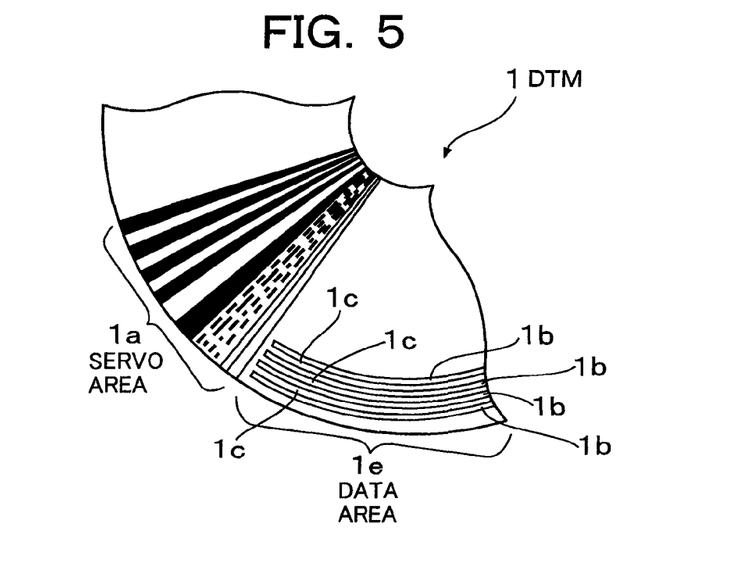
FIG. 5 shows partial tracks of a discrete track medium (DTM) to which the magnetic head to be tested accesses.

A reference numeral 17 depicts a data write circuit and a reference numeral 18 depicts a test data generation circuit. The test data generation circuit 18 generates a designated test data under control of the data processing•control device 20 and sends the test data to the data write circuit 17. The data write circuit 17 generates a write signal according to the test data, drives a write amplifier provided in the head cartridge 6 and writes the data in a designated track through the thin film inductive head of the head 9. FIG. 5 shows about one forth section of the DTM 1 to explain the portion of the DTM, which is accessed by a magnetic head to be tested.

Servo areas 1a corresponding to respective sectors are provided in the DTM 1. In the servo area 1a, track position information, servo information (servo burst signal) for determining ON track position and sector number, etc., are recorded. Following the servo areas, discrete tracks 1b are formed, respectively, and an area between the adjacent discrete tracks 1b is filled with a non-magnetic member 1c.

The discrete tracks 1b constitute a data area 1e in which the test data, etc., is written. The width of the discrete truck 1b is in the order of 50 nm to 60 nm. The write sensitive width Wa of the head 9 is 60 nm or more at present.

Returning to FIG. 1, the data processing•control device 20 is constructed with an MPU 21, a memory 22, an interface 23, a CRT display 24 and a key board, etc., and these components are mutually connected by a bus. In the memory 22, a head access program 22a, a test data oblique write program 22b, a read characteristics profile acquiring program 22c and a profile generation program 22d for generating a profile approximating the read characteristics, etc., are stored.

Figure 2:
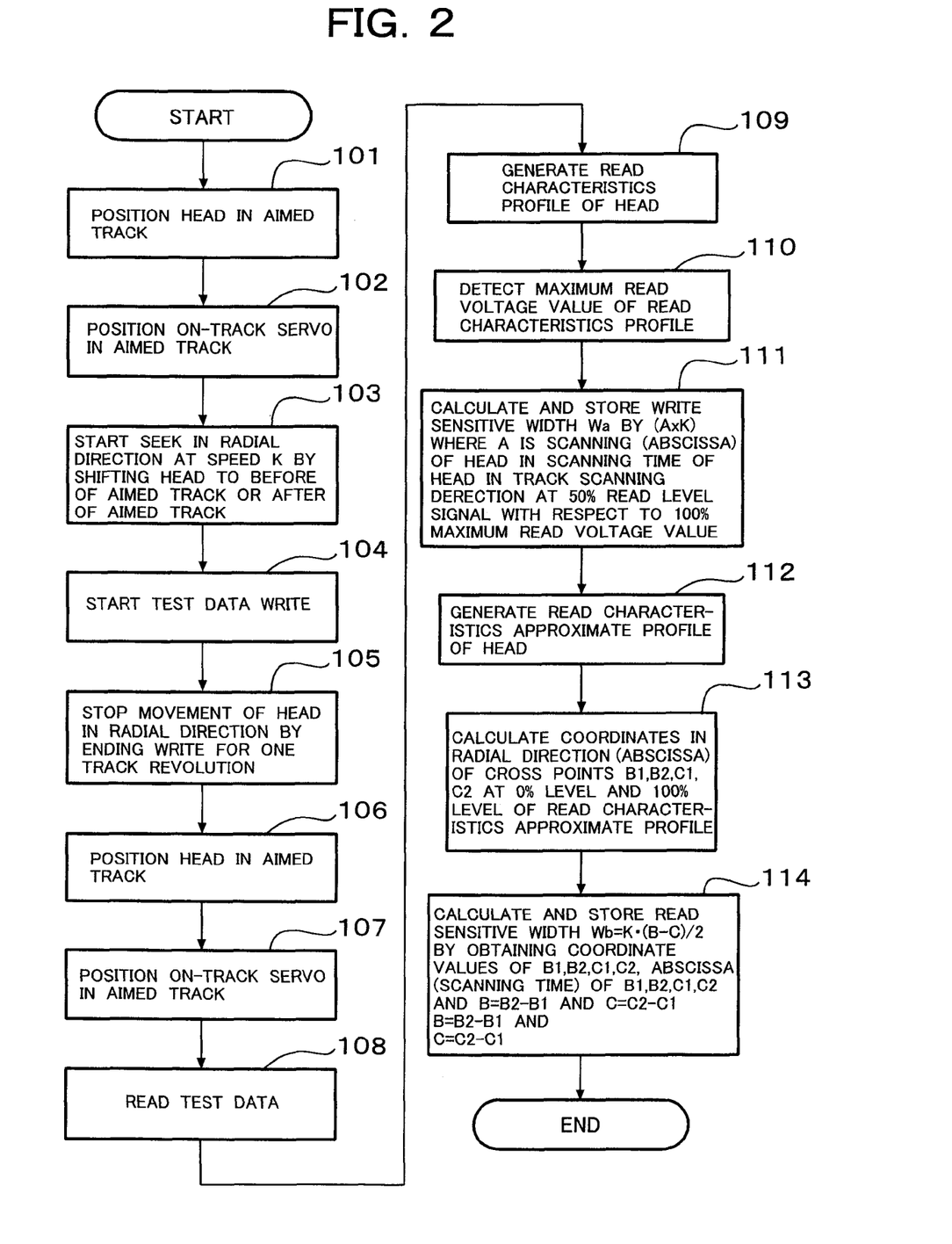
FIG. 2 is a flow chart of a read characteristic measuring process of a test magnetic head.

FIG. 2 shows a flow chart of the read characteristics measuring process of the test magnetic head.

The MPU 21 activates the head access control circuit 16 by setting a moving distance r [mm] in R direction in a designated register of the head access control circuit 16 through the interface 23 by executing the head access program 22a.

By setting the moving distance r [mm] in the R direction in the register, the X stage 3a is driven by the head access control circuit 16 to roughly move the head from a reference point or a designated track position by r [mm] and then the piezoelectric stage 4 is driven to finely move the head 9 by the distance r, so that the head 9 is positioned in an aimed track (Step 101). Therefore, the head 9 is positioned in the aimed track from the reference point or the designated truck position.

And, in order to control the ON track positioning, the MPU 21 activates the servo positioning control circuit 11 to drive the piezoelectric actuator 7 in such a way that the head 9 is positioned in the aimed track (Step 102).

Then, the MPU 21 calls and executes the test data oblique write program 22*b* for writing the test data in a track by obliquely crossing the track. In this execution, the MPU 21 in the ON track servo control state calls and executes the head access program 22*a* to shift the head 9 behind the aimed track. Then, the MPU 21 starts the seeking of the head 9 toward the front side in the radial direction at a designated speed K (Step 103) and starts the writing of the test data (Step 104). In this case, it is possible to position the head 9 in the front side of the aimed track and start the seeking of the head 9 toward the rear side in the radial direction at a designated speed K.

The shift positioning of the head 9 in the front or the rear side of the aimed track is realized by driving the piezoelectric actuator 5 by the head access control circuit 16 by setting (R direction moving distance−X [nm] or +X [nm]) in a designated resister of the head access control circuit 16 through the interface 23.

After the above shift positioning, the seeking at the designated speed K is performed by the MPU 21 by executing the head access program 22*a* and setting the moving distance P [nm] in the R direction in a designated register of the head access control circuit 16 through the interface 23 after an index signal IND (or a start sector signal for one revolution) generated by a rotary encoder of the spindle 2 shown in FIG. 1 is received and repeating the setting of the moving distance P [nm]. According to this setting, the head access control circuit 16 drives the piezoelectric actuator 5 to seek the head 9 in the radial direction at the designated speed K.

The head 9 is obliquely moved by the MPU 21 in the radial direction by a distance exceeding one track and, when the writing of one track of the test data by the thin film inductive head is ended, stops the movement of the head 9 in radial direction (Step 105) and the processing of the test data oblique write program 22*b* is ended.

For the purpose of simplification of description, it is assumed that the head is moved in the radial direction by the distance for 1 track when the DTM 1 rotates one revolution requiring time T.

Figure 3:
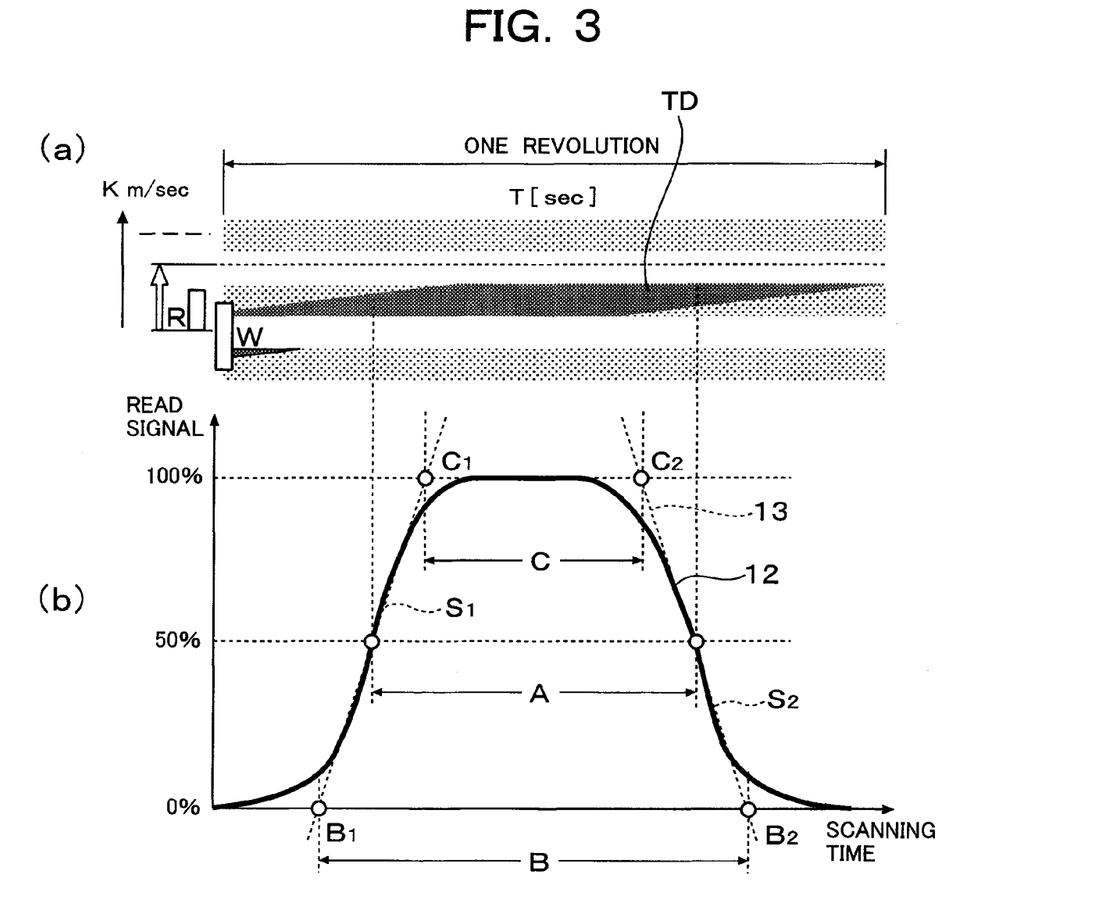

FIG. 3(*a*) shows a recording state of an aimed track TR when the head 9 is moved from the rear side to the front side of the aimed track TR and crosses the aimed track TR. As shown in FIG. 3(*a*), the test data TD is written obliquely in the aimed track TR when the head 9 moves from the front side to the rear side or from the rear side to the front side of the aimed track in the radial direction.

Incidentally, the recording state shown in FIG. 3(*a*) when the head 9 is moved from the front side to the rear side of the aimed track and crosses the track has reversed in horizontal and vertical directions.

The test data TD is written obliquely in the aimed track TR at a designated angle corresponding to the moving speed K in the radial direction and the rotating speed of the DTM 1. The time T for one revolution of the DTM 1 corresponds to a time required when the write head crosses the aimed track TR. Therefore, the moving speed K in the radial direction can be obtained as K=D/T, where D is a track width.

After the writing of the test data is ended, the MPU 21 calls a read characteristics profile acquiring program 22*c*.

After the processing of the test data oblique write program 22*b*, the MPU 21 executes the read characteristics profile acquiring program 22*c*. In this execution, the MPU 21 calls and executes the head access program 22*a* to set the track TR as the aimed track and to position the head 9 in the aimed track by seeking the head 9 (Step 106). After this positioning, the MPU 21 activates the servo positioning control circuit 11 to perform the ON track servo positioning of the head 9 in this track (Step 107) and read the obliquely written test data TD (Step 108). Next, the MPU 21 generates a read characteristics profile of the head 9 for the read voltage with respect to the scanning time T for one track (Step 109).

As a result, the read characteristics profile 12 shown in FIG. 3(*b*).

Then, the MPU 21 detects a maximum read voltage of the read characteristics profile 12 (Step 110). Then, the MPU 21 transforms the measured read voltage into a ratio with respect to the read voltage in a flat portion of the read characteristics profile with the ratio of maximum voltage being 1.0. A width A of the scanning time (abscissa) in the track scanning direction of the head 9 (write head) is calculated by setting a read signal 50% with respect to the level of the read signal of the maximum value being 100%, K×A is calculated as the write sensitive width Wa, where K is the moving speed of the head 9 in the radial direction, and the write sensitive width is stored in a designated region of the memory 22 (Step 111).

The write sensitive width Wa will be described in detail with reference to FIG. 4.

Figure 4:
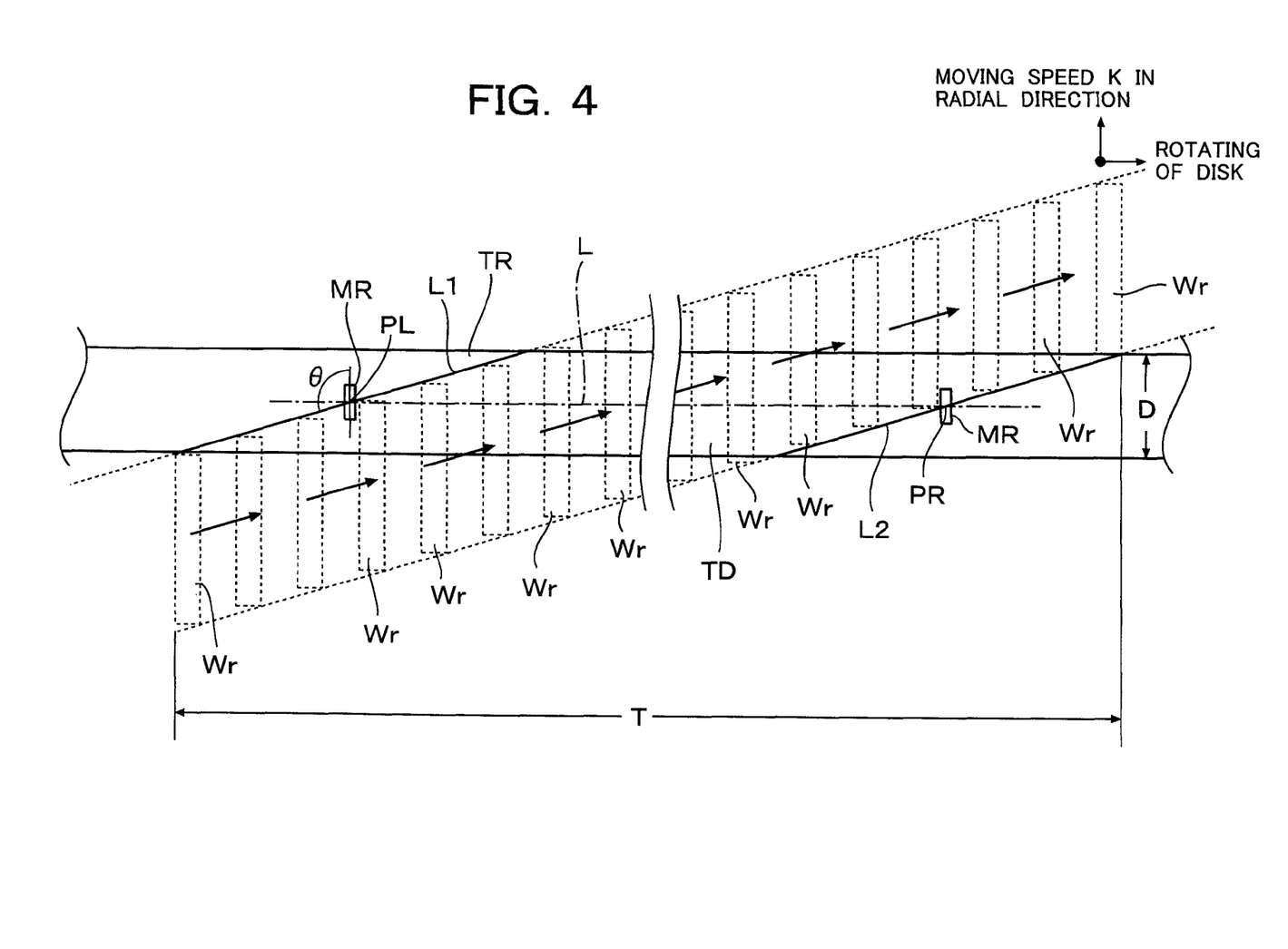
FIG. 4 shows a read characteristics profile when a test data is written oblique and crossing a track.

Incidentally, FIG. 4 shows the read characteristics profile which is obtained when the test data is written in a track in a state where the head is moved obliquely across the track.

As shown in FIG. 4, it is assumed that the recording area of the test data written with the write sensitive width Wa by the thin film inductive head (write head) is rectangular form Wr shown by dotted lines. The area Wr moves through the aimed track TR obliquely upward in the radial direction at the moving speed K and crosses the aimed track TR during one revolution of the disk.

On the other hand, the MR head (read head) scans the recording area of the test data TD along a line L in a center position of the aimed track TR correspondingly to a rotating disk to read the test data TD.

Since the recording area of the test data TD is written obliquely, the MR head is tilted to the test data TD by θ unlike in the original read state. Therefore, the read voltage of the test data is lowered by a designated rate. However, the MR head reads the test data written in the rectangular area Wr (write sensitive width Wa) in the radial direction, correspondingly to the movement of the rectangular area in the radial direction.

A half of the MR head in a point PL crossing a left side oblique line L1 is entered into the rectangular area Wr of the test data TD similarly to the conventional state. Similarly, a half of the MR head in a point PR crossing a right side oblique line L2 goes out from the rectangular area Wr of the test data TD similarly to the conventional state. Though the boundary lines formed by the oblique lines L1 and L2 are oblique, the entering and the going out of the MR head with respect to the recording track are the same. Since the width of the MR head (read head) in the track scanning direction is as narrow as about 1 nm, the tilting angle θ does not influence substantially.

Considering the rectangular area Wr between the cross point PL and the cross point PR when the MR head scans the test data TD from the cross point PL to the cross point PR, it is clear that the top to the bottom of the rectangular area Wr is traced completely.

Therefore, it is possible to obtain the read characteristics profile by reading the tilted test data TD.

Since the test data is recorded by moving the write head by the track width in the radial direction during the time T corresponding to one revolution of the disk, the time T is important.

Since the movement of the head corresponding to the track width D, which moves at the moving speed K, is determined by the time T for one revolution of the disk, the read head scanning time with the test data TD being the fixed side can be calculated by converting it to the relative moving distance of the read head in the radial direction with respect to the test data TD by using the relation between the track width D and the time T.

Therefore, it can be thought that the read operation of the test data by the MR head is to enter the MR head into the test data TD recording area in the radial direction through the left side oblique line L1 at the moving speed K. On the contrary, it can be thought that the read operation of the test data by the MR head is to go out the MR head from the test data TD recording area in the radial direction through the right side oblique line L2 at the moving speed K.

Therefore, the write sensitive width Wa as the movement in the radial direction can be calculated by Wa=D·A/T=K·A, where A is the scanning time of the read head (MR head) in 50% level of the read characteristics profile 12.

The read characteristics profile 12 thus obtained and shown in FIG. 3(b) is not the read voltage characteristics profile as shown in FIG. 6 which has the ideal flat portion. The reasons for this are that, in the original read state, the read head is tilted to the test data TD by θ and that the characteristics such as the read characteristics profile 12 can not sufficiently be read due to that the reading of the MR head is influenced by the magnetization of the portion of the write head since the track width and the width of the MR head are close.

Therefore, a read characteristics approximate profile 13 having a center flat portion is obtained from the curved lines on the both sides of the read characteristics profile 12 shown in FIG. 3(b) (Step 110).

That is, the MPU 21 calls and executes a profile generation program 22d for generating a profile, which approximates to the read characteristics, after the execution of the read characteristics profile acquiring program 22c is ended. The MPU 21 generates the profile 13 by obtaining tangential lines S1 and S2 corresponding to the curved lines between slice levels assigned to the both side curved lines, for example, the curved lines between the slice levels 20% and 80% and replacing the both side curved lines of the read characteristics profile 12 by the tangential lines S1 and S2.

The MPU 21 calculates the read sensitive width Wb of the MR head from Wb=K·(B−C)/2 by setting points B1 and B2 at which the tangential lines S1 and S2 intersect the 0% level line (abscissa) and points C1 and C2 at which the tangential lines S1 and S2 intersect the 100% level line and obtaining these points from the coordinates of the radial direction (Step 113) as a moving distance B of the head 9 in the radial direction between the points B1 and B2 and as a moving distance C of the head 9 in the radial direction between the points C1 and C2 (Step.

The distance (B−C) in the approximate profile 13 of the read characteristics is a sum of inclined portions in the opposite end portions of this waveform in the radial direction. In FIG. 6, an inclined portion on the left side in FIG. 6 is a moving distance of the MR head in the radial direction from a time when the MR head inters into the write area of the test data to a time when it enters into the write area completely. This distance corresponds to the read width Wb of the MR head. The inclined portion on the right side in FIG. 6 is a moving distance of the MR head in the radial direction from a time when the MR head exits from the write area of the test data to a time when it exits from the write area completely. This distance corresponds to the read width Wb of the MR head too.

The read relation of the curved lines on the both sides of the test data obtained by the read head is the same as the relation when the conventional read voltage profile shown in FIG. 6. Therefore, the approximate profile 13 of the read characteristics, which is obtained by replacing the curved lines on the both sides with the tangential lines S1 and S2, has the characteristics close to the conventional read characteristics.

Since such the inclined portions exist in the front and rear sides, the average value is obtained by K·(B−C)/2 as the read sensitive width Wb.

Incidentally, in this embodiment, the write head crosses the aimed track TR having width D in the scanning in a time T corresponding to one revolution of the DTM 1.

However, it is general that the write head moves a distance corresponding to n tracks at a designated speed K during m rotations (m is an integer not smaller than 1, n≧m) and the speed K is n·D/(m·T). That is, the write head is moved in the radial direction by n·D/m during time T for one revolution of the DTM 1.

When the scanning time of the read head at the 50% level is A, the moving distance of the read head in the radial direction for 1 track becomes (n·D/m)·A/T. Since K=n·D/(m·T), the moving distance of the read head in the radial direction, that is, the write sensitive width Wa becomes K·A as in the described case, a result becomes the same as the result when the read head is moved in the radial direction by the track width during the time T corresponding to one revolution.

In other words, so long as the one rotation speed of the magnetic recording medium at the write time and at the read time is the same, the writing speed of the test signal by the write head and the read speed of the test signal in the rotating direction of the magnetic recording medium are the same. Therefore, the canning times and the scanning positions of the read head and the write head in the rotating direction become the same. However, since the recorded test data is moved in the radial direction with the scanning of the test data of the read head, the movement of the test data in the radial direction and the scanning time of the read head are related to the read of the test data when the read head reads the test data.

In the case mentioned above, the tangential lines S1 and S2 with respect to the curved lines on the both sides of the read characteristics approximating profile 13 are to obtain linear lines approximating to the curved lines on the both sides. Therefore, in lieu of the acquisition of the tangential lines, it is possible obtain the approximate linear lines on the both sides by approximating the curved lines between 20% and 80% or by applying the least squares method to the measuring values in this range.

Further, the calculation of the write sensitive width Wa in Step 112 may be performed together with the calculation of the read sensitive width Wb in not the read characteristics profile 12 but the read characteristics approximate profile 13.

Further, the slice levels of 20% and 80% for determining the range of the curved lines on the both sides of the read characteristics approximate profile 13 are a mere example. In this invention, it is enough to obtain the approximate linear lines in the range of the curved lines including the measuring values near 50% and the range is not limited to from 20% to 80%. The reason for inclusion of the curved lines of the measuring value of around 50% is that, since a half of the MR head enters in the write area of the test data in this range, the test data is read without substantial influence of the around recording state. Further, in this state, the relation between the MR head and the recorded information is close to the relation when the conventional read characteristics of the magnetic head is obtained though the recording state of the test data is fragmentary.

In the described embodiment, after the composite magnetic head is moved to a front or rear position of the aimed track, the composite magnetic head is moved from the front position to the rear or vice versa at a designated speed K in the radial direction of the rotating DTM 1. However, since it is possible, in this invention, to obliquely write the test data in a adjacent track by recording the test data in 1 track or more by seeking a track toward the adjacent track after the positioning in the aimed track, it is possible to obtain the read characteristics profile similarly. In this case, the test data is read from not the aimed track but the adjacent track.

The DTM in this embodiment is a mere example and this invention can use a BPM (bit patterned medium) or other magnetic recording medium having an unevenly patterned recording layer.

The invention claimed is:

1. A measuring method for measuring a write sensitive width and/or a read sensitive width of a composite magnetic head having a write head and a read head, comprising the steps of:
   reading a servo information from a designated track of a rotating magnetic recording medium having a recording layer of discrete track type, a bit pattern type or other type having uneven pattern, crossing the designated track obliquely by the composite magnetic head at a designated speed K in a radial direction of the magnetic recording medium and reading a test data in the designated tack by said write head and writing a test data in the designated track by the write head under an ON track servo control for ON-tracking by reading a servo information from the designated track of the rotating magnetic recording medium,
   reading the test data from the designated track by the read head by positioning the composite magnetic head under the ON track servo control,
   obtaining a read characteristics profile for a read voltage corresponding to a track scanning time of the read head on the basis of the read signal of the read head, and
   calculating the write sensitive width by multiplying the test data scanning time of the read head with the designated moving speed K.

2. A measuring method for measuring a write sensitive width and/or a read sensitive width of a composite magnetic head, as claimed in claim 1, wherein the oblique crossing of the designated track by the composite magnetic head is performed by
   positioning the composite magnetic head in the designated track under the ON track servo control,
   moving the composite magnetic head to a forward or rearward the designated track, and
   moving the composite magnetic head to a rearward or forward the designated track in a radial direction of the magnetic recording medium at the designated sped K.

3. A write width/read width measuring device of a composite magnetic head using the measuring method for measuring a write sensitive width and/or a read sensitive width of a composite magnetic head, as claimed in claim 2.

4. A measuring method for measuring a write sensitive width and/or a read sensitive width of a composite magnetic head, as claimed in claim 1, wherein the write sensitive width is obtained by multiplying the test data scanning time in 50% read level in the read characteristics profile with the designated moving speed K.

5. A measuring method for measuring a write sensitive width and/or a read sensitive width of a composite magnetic head, as claimed in claim 1, wherein the read sensitive width is calculated on the basis of a read characteristics approximate profile having a center flat portion and obtained from approximate linear lines on both sides of the read characteristics profile obtained from curved lines of the both sides of the read characteristics profile.

6. A measuring method for measuring a write sensitive width and/or a read sensitive width of a composite magnetic head, as claimed in claim 5, wherein the magnetic recording medium is of the discrete track type having a track width equal to or narrower than the write sensitive width of the write head.

7. A measuring method for measuring a write sensitive width and/or a read sensitive width of a composite magnetic head, as claimed in claim 6, wherein the read head of the composite magnetic head is an MR head and the write head thereof is a thin film inductive head and the approximate linear lines are calculated by tangential lines to the curved lines on the both sides including read level of 50% of the maximum read level of the read characteristics profile or a linear line approximation or an approximation by minimum square method.

8. A measuring method for measuring a write sensitive width and/or a read sensitive width of a composite magnetic head, as claimed in claim 7, wherein the approximate linear lines are calculated on the basis of the curved portions on the both sides in a read level range from 20% to 80% with respect to the maximum read level.

9. A measuring method for measuring a write sensitive width and/or a read sensitive width of a composite magnetic head, as claimed in claim 7, wherein the read sensitive width of the MR head is calculated by K·(B−C)/2 where K is the designated speed, B is a moving distance of the composite magnetic head in a radial direction between a point B1 and a point B2 which are intersection points of the approximate linear lines on both sides of the read characteristics profile and a line of a 0% read level with respect to the maximum 100% level of the read characteristics profile and C is a moving distance of the composite magnetic head in a radial direction between a point C1 and a point C2 which are intersection points of the approximate linear lines on the both sides and a 100% read level line of the read characteristics profile.

10. A write width/read width measuring device of a composite magnetic head using the measuring method for measuring a write sensitive width and/or a read sensitive width of a composite magnetic head, as claimed in claim 1.

11. A measuring method for measuring a write sensitive width and/or a read sensitive width of a composite magnetic head having a write head and a read head, comprising the steps of:
   writing a test data in an adjacent track to a designated track by the write head by positioning the composite magnetic head in the designated track, moving the composite magnetic head from the designated track to the adjacent track in a radial direction of the magnetic recording medium at a designated speed K to cross the adjacent track obliquely under an ON track servo control state for on-tracking by reading a servo information from the designated track of a rotating magnetic recording medium having a recording layer of discrete track type, a bit pattern type or other type having uneven pattern, reading the test data from the adjacent track by the read head by positioning the composite magnetic head in the adjacent track under the ON track servo control, obtaining a read characteristics profile for read voltage with respect to the track scanning time of the read head on the basis of the read signal of the read head, and calculating the write sensitive width by obtaining a relative moving distance of the composite magnetic head in a radial direction with respect to the test data by multiplying the test data scanning time of the read head with the designated moving speed K.

12. A measuring method for measuring a write sensitive width and/or a read sensitive width of a composite magnetic head as claimed in claim 11, wherein the oblique crossing of the adjacent track by the composite magnetic head is performed by moving the composite magnetic head in the radial direction by a distance from the designated track over the adjacent track during one revolution of the magnetic recording medium.

13. A measuring method for measuring a write sensitive width and/or a read sensitive width of a composite magnetic head, as claimed in claim 12, wherein the write sensitive width is obtained by multiplying the test data scanning time in 50% read level in the read characteristics profile with the designated moving speed K.

14. A write width/read width measuring device of a composite magnetic head using the measuring method for measuring a write sensitive width and/or a read sensitive width of a composite magnetic head, as claimed in claim 11.

* * * * *